(12) United States Patent
Levy et al.

(10) Patent No.: US 9,351,055 B2
(45) Date of Patent: May 24, 2016

(54) HIGH-RELIABILITY ACTIVE OPTICAL CABLE (AOC) WITH REDUNDANT EMITTERS

(71) Applicant: MELLANOX TECHNOLOGIES LTD., Yokneam (IL)

(72) Inventors: Shmuel Levy, Kyriat Tivon (IL); Elad Mentovich, Tel Aviv (IL); Eyal Waldman, Tel Aviv (IL); Shai Cohen, Haifa (IL); Evelyn Landman, Haifa (IL); Sylvie Rockman, Zichron Yaakov (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

(21) Appl. No.: 14/458,273

(22) Filed: Aug. 13, 2014

(65) Prior Publication Data

US 2015/0050015 A1 Feb. 19, 2015

Related U.S. Application Data

(60) Provisional application No. 61/866,073, filed on Aug. 15, 2013.

(51) Int. Cl.
*G02F 1/00* (2006.01)
*H04Q 11/00* (2006.01)
*H04B 10/032* (2013.01)

(52) U.S. Cl.
CPC ......... *H04Q 11/0005* (2013.01); *H04B 10/032* (2013.01); *H04Q 2011/0043* (2013.01)

(58) Field of Classification Search
CPC .... H04B 10/03; H04B 10/032; H04B 10/035; H04B 10/038; H04B 10/2575; H04Q 11/0067; H04Q 11/0005
USPC ............. 398/1, 2, 3, 4, 5, 7, 8, 10, 13, 17, 22, 398/23, 24, 25, 33, 38, 66, 68, 70, 71, 72, 398/135, 138, 139, 45, 48
See application file for complete search history.

(56) References Cited

U.S. PATENT DOCUMENTS

| 4,227,260 A | 10/1980 | Vojvodich et al. |
| 4,306,313 A | 12/1981 | Baldwin |
| 5,469,442 A | 11/1995 | Seligmann et al. |

(Continued)

OTHER PUBLICATIONS

Hirabayashi et al, "Optical-Fiber Variable-Attenuator Arrays Using Polymer-Network Liquid Crystal", IEEE Photonics Technology Letters, vol. 13, pp. 487-489, May 5, 2001.

*Primary Examiner* — Hanh Phan
(74) *Attorney, Agent, or Firm* — D. Kligler IP Services Ltd.

(57) ABSTRACT

An apparatus includes an array of electro-optical transducers, control circuitry, and a connector housing. The electro-optical transducers are configured to convert between electrical signals and respective optical signals conveyed over respective optical fibers. The control circuitry is configured, in response to a failure of a first electro-optical transducer in the array that is associated with a given optical fiber, to switch one or more of the electrical signals and the optical signals so as to replace the first electro-optical transducer with a second electro-optical transducer in the array in conveying an optical signal over the given optical fiber. The connector housing contains the array of the electro-optical transducers and the control circuitry.

14 Claims, 5 Drawing Sheets

(56) References Cited

U.S. PATENT DOCUMENTS

| | | |
|---|---|---|
| 5,485,465 A | 1/1996 | Liu et al. |
| 5,594,581 A | 1/1997 | Alphonsus |
| 6,325,553 B1 | 12/2001 | Deacon et al. |
| 6,821,026 B2 | 11/2004 | Devine et al. |
| 7,116,694 B2 | 10/2006 | Peters et al. |
| 7,403,275 B2 | 7/2008 | Mathes et al. |
| 7,551,850 B2 | 6/2009 | Alana et al. |
| 7,801,442 B2 | 9/2010 | Wang et al. |
| 7,835,268 B2 * | 11/2010 | Tanaka .......................... 370/216 |
| 7,865,077 B2 * | 1/2011 | Mukojima ........................ 398/1 |
| 8,019,220 B2 * | 9/2011 | Ozaki ............................. 398/66 |
| 8,041,210 B2 | 10/2011 | Aronson et al. |
| 8,422,887 B2 | 4/2013 | Haramaty et al. |
| 8,457,488 B2 * | 6/2013 | Almog .............................. 398/5 |
| 8,824,899 B2 * | 9/2014 | Yamashita .................... 398/168 |
| 2005/0089331 A1 | 4/2005 | Margalit |
| 2014/0050471 A1 * | 2/2014 | Bernasconi ...................... 398/2 |

* cited by examiner

HIGH-RELIABILITY ACTIVE OPTICAL CABLE (AOC) WITH REDUNDANT EMITTERS

CROSS-REFERENCE TO RELATED APPLICATIONS

This application claims the benefit of U.S. Provisional Patent Application 61/866,073, filed Aug. 15, 2013, whose disclosure is incorporated herein by reference.

FIELD OF THE INVENTION

The present invention relates generally to optical fiber communications, and particularly to methods and systems for improving reliability of active optical cables (AOCs).

BACKGROUND OF THE INVENTION

Active optical cables (AOCs) are used for various communication applications and several publications discuss techniques to improve their performance. Examples of prior art techniques are provided below.

U.S. Pat. No. 8,041,210, to Aronson, et al., whose disclosure is incorporated herein by reference, describes an optical transmission system, which includes more optical channels than electrical channels. If an optical channel is not functioning, the signals may be diverted to another optical channel since there are more optical channels than electrical channels.

U.S. Pat. No. 7,801,442, to Wang, et al., whose disclosure is incorporated herein by reference, describes redundant channel implementation to extend optical transceiver lifetime and reliability. Embodiments introduce redundant optical channels to significantly extend the lifetime of parallel optical transceivers.

U.S. Pat. No. 6,821,026, to Devine, et al., whose disclosure is incorporated herein by reference, describes a redundant configurable VCSEL laser array optical light source which provides for integrating optical communications capabilities into manufacturing processes for a substrate or submount such as a silicon or ceramic substrate, a multi-chip module, a package board, backplane or similar component.

U.S. Pat. No. 4,306,313, to Baldwin, whose disclosure is incorporated herein by reference, describes an optical transmission system which employs a plurality of receiver-transmitter pairs. One of the plurality of pairs is selected to propagate optical signals under control of switching means. The optical signal as propagated is monitored and if a fault is detected in the signal, another redundant receiver-transmitter pair is automatically switched in.

U.S. Pat. No. 8,422,887, to Haramaty, et al., whose disclosure is incorporated herein by reference, describes a system for redundancy in Ethernet passive optical networks (EPONs), which facilitates fast recovery from failure, path redundancy of a fiber optic network, and location redundancy of optical line terminals (OLTs).

SUMMARY OF THE INVENTION

An embodiment of the present invention that is described herein provides an apparatus including an array of electro-optical transducers, control circuitry, and a connector housing. The electro-optical transducers are configured to convert between electrical signals and respective optical signals conveyed over respective optical fibers. The control circuitry is configured, in response to a failure of a first electro-optical transducer in the array that is associated with a given optical fiber, to switch one or more of the electrical signals and the optical signals so as to replace the first electro-optical transducer with a second electro-optical transducer in the array in conveying an optical signal over the given optical fiber. The connector housing contains the array of the electro-optical transducers and the control circuitry.

In some embodiments, the control circuitry includes one or more optical switches which are configured to switch one or more of the optical signals. In other embodiments, the control circuitry includes one or more electrical switches which are configured to switch one or more of the electrical signals. In yet other embodiments, the control circuitry includes a controller, which is configured, in response to the failure of the first electro-optical transducer, to switch one or more of the electrical signals and the optical signals.

In an embodiment, the controller receives an input of the failure from an external source. In another embodiment, the input of the failure from the external source includes a detector at a receiving end of the given optical fiber, which is configured to detect that the optical signal is not conveyed over the given optical fiber, and to send the input to the controller. In yet another embodiment, the input of the failure from the external source includes a detector at a receiving end of the given optical fiber, which is configured to detect that the optical signal is not conveyed over the given optical fiber, and to send the input to the controller. In an alternative embodiment, the input of the failure from the external source includes equipment at a transmitting end of the electrical signal.

In some embodiments, the input of the failure from the external source includes a detected change in a response of the failed first electro-optical transducer. In other embodiments, the electro-optical transducers include optical emitters. In yet other embodiments, the electro-optical transducers include optical detectors.

In an embodiment, the array includes a redundant transducer serving as the second electro-optical transducer, and, in response to the failure, the control circuitry is configured to switch the electrical signals and the optical signals of the electro-optical transducers located between the first electro-optical transducer and the redundant transducer to respective neighboring transducers towards the redundant transducer.

In another embodiment, the array includes a given number of electro-optical transducers, which is larger than the number of the respective optical fibers.

There is additionally provided, in accordance with an embodiment of the present invention, a method including converting between electrical signals and respective optical signals conveyed over respective optical fibers, using an array of electro-optical transducers. In response to a failure of a first electro-optical transducer in the array that is associated with a given optical fiber, one or more of the electrical signals and the optical signals are switched, so as to replace the first electro-optical transducer with a second electro-optical transducer in the array in conveying an optical signal over the given optical fiber.

There is further provided, in accordance with an embodiment of the present invention, a method including providing an array of electro-optical transducers, which are configured to convert between electrical signals and respective optical signals conveyed over respective optical fibers. The array of electro-optical transducers is connected to control circuitry, which is configured, in response to a failure of a first electro-optical transducer in the array that is associated with a given optical fiber, to switch one or more of the electrical signals and the optical signals so as to replace the first electro-optical transducer with a second electro-optical transducer in the array in conveying the optical signal over the given optical fiber. The array of the electro-optical transducers and the control circuitry are packaged in a connector housing.

The present invention will be more fully understood from the following detailed description of the embodiments thereof, taken together with the drawings in which:

DETAILED DESCRIPTION OF EMBODIMENTS

Overview

Active optical cables comprise one or more optical fibers. Such cables comprise optical transmitters and receivers built into connector modules at the ends of the cable for transmitting and receiving the optical communication signals carried by the fibers. The connector modules plug into suitable electrical communication ports, such as Gigabit Ethernet or InfiniBand ports, of switching and computing equipment. Optoelectronic components in the connector modules convert the high-speed electrical signals output by the ports into optical signals for transmission over the fibers. In addition, the optoelectronic components convert the optical signals received over the fibers into high-speed electrical signals for input to the ports. Such connector modules are commonly referred to as transceiver modules.

In many active optical cables, laser diodes, such as vertical-cavity surface emitting lasers (VCSELs), are used in the transceiver modules to generate the optical signals for transmission over the fibers. VCSELs in particular are favored for their high bandwidth and efficiency. In some implementations, an array of such VCSELs is used to drive a corresponding array of optical fibers, which are joined together in a ribbon configuration.

Embodiments of the present invention that are described hereinbelow provide active optical cables and transceiver modules with built-in redundancy of the optical transmitters. The redundancy is implemented by adding to an optical interface module one or more redundant emitters, such as additional VCSELs, which are normally held on standby and which are not used for data transmission.

In some embodiments, the optical interface module (OIM) comprises an array of electro-optical transducers, which are configured to convert between electrical signals and respective optical signals conveyed over respective optical fibers. In addition, the OIM comprises control circuitry, which is configured to switch one or more of the electrical and optical signals between the transducers. The transducers are capable of converting from electrical signals to optical signals, and/or from optical signals to electrical signals. A connector housing holds the array of transducers and the control circuitry.

In response to a failure of a transducer in the array that is associated with a given optical fiber, the circuitry switches to replace the failed transducer with a redundant functional transducer in the array in order to convey the optical signal over the given optical fiber without reconfiguration of the cable or the ports.

Identification of the failure may be carried out in various ways. In an embodiment, an optical detector at the opposite end of the active optical cable may sense the failed transducer by not detecting an optical signal in the respective fiber. Subsequently, this failure is transmitted to the control circuitry, which activates switches to reroute the respective signal and bypass the failed transducer.

In another embodiment, a controller at the transmit end may sense a failure by recognizing changes in the characteristics of a transducer. In response, the transmitting-end controller passes this information to the control circuitry, which bypasses the failed transducer.

Since VCSEL failure is a dominant failure mode in AOCs, the disclosed techniques considerably enhance AOC reliability. At the same time, the disclosed techniques do not require extra optical fibers in the AOC, since they switch the redundant transducer to emit light into the same fiber as the failed transducer. In some embodiments, the disclosed techniques are self-contained and transparent, in the sense that they do not require any cooperation or involvement from the communication equipment connected to the AOC.

For the sake of clarity and convenience of description, the embodiments that are described below refer to a particular optical cable configuration, using VCSELs as emitters and certain types of switching elements. The principles of the present invention, however, may similarly be implemented using other types of emitters and switching elements, as well as differently configured optical cables and connector modules.

System Description

Figure 1:
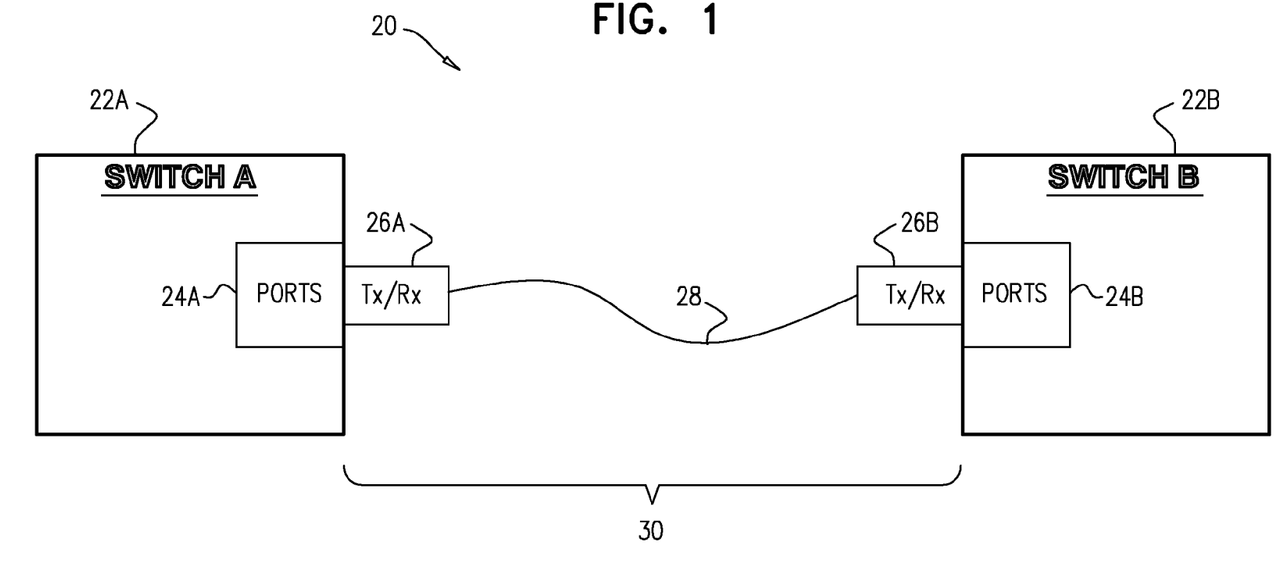
FIG. 1 is a block diagram that schematically illustrates an optical communication system, in accordance with an embodiment of the present invention.

FIG. 1 is a block diagram that schematically illustrates an optical communication system 20, in accordance with an embodiment of the present invention.

Communication ports 24A and 24B of two switches 22A and 22B, also herein termed "switch A" and "switch B," are connected by an active optical cable 30. Cable 30 comprises a ribbon of one or more optical fibers 28, terminated at each end by generally similar transceiver modules 26A and 26B (denoted Tx/Rx in FIG. 1). The terms "transceiver module" and "connector module" are used interchangeably in the present patent application.

Each transceiver module comprises signal conversion components, such as arrays of optical emitters and optical receivers, assembled in an optical interface module 32, as will be described in FIG. 4 of this patent application. The emitters and receivers are connected to respective fibers 28. The terms "emitter" and "transmitter" are used interchangeably, and the terms "transceiver module," "optical interface module," and "connector module" are also used interchangeably in the present patent application.

For example, an emitter, such as vertical-cavity surface emitting laser (VCSEL) in module 26A, receives electrical inputs from port 24A to which it is connected and outputs corresponding optical signals to fiber 28. A receiver in module 24B, receives optical signals from fiber 28 and converts them to corresponding electrical signals for input to port 24B.

The receivers are excluded from the description that follows, since the inventors have found that problems of reliability and device failure occur much more often on the transmitting (emitting) side. However, the same sort of redundancy scheme that is described herein with respect to the transmitters may similarly be implemented on the receiving side.

Figure 2:
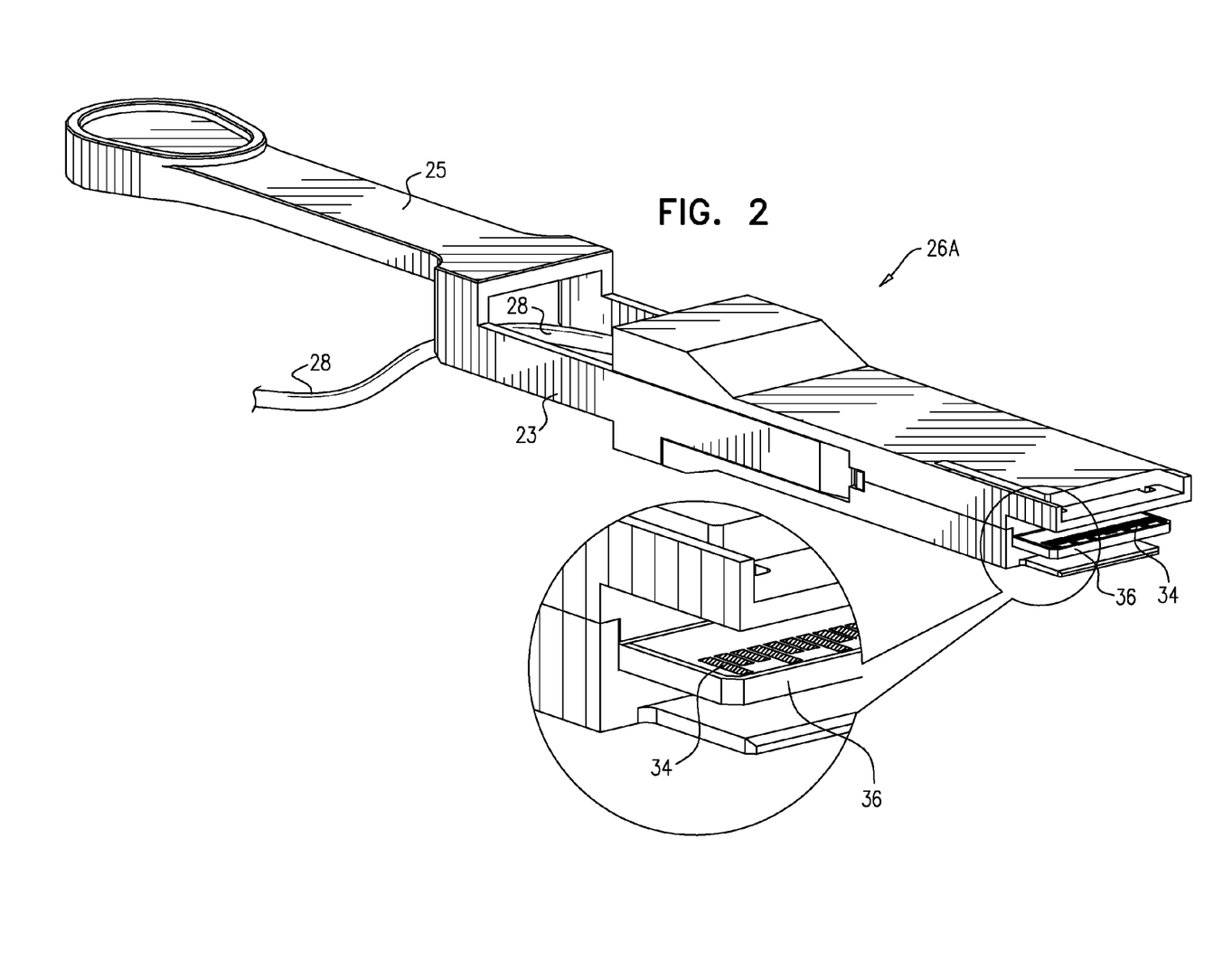
FIGS. 2 and 3 are schematic pictorial illustrations of transceiver modules, in accordance with an embodiment of the present invention.
Figure 3:
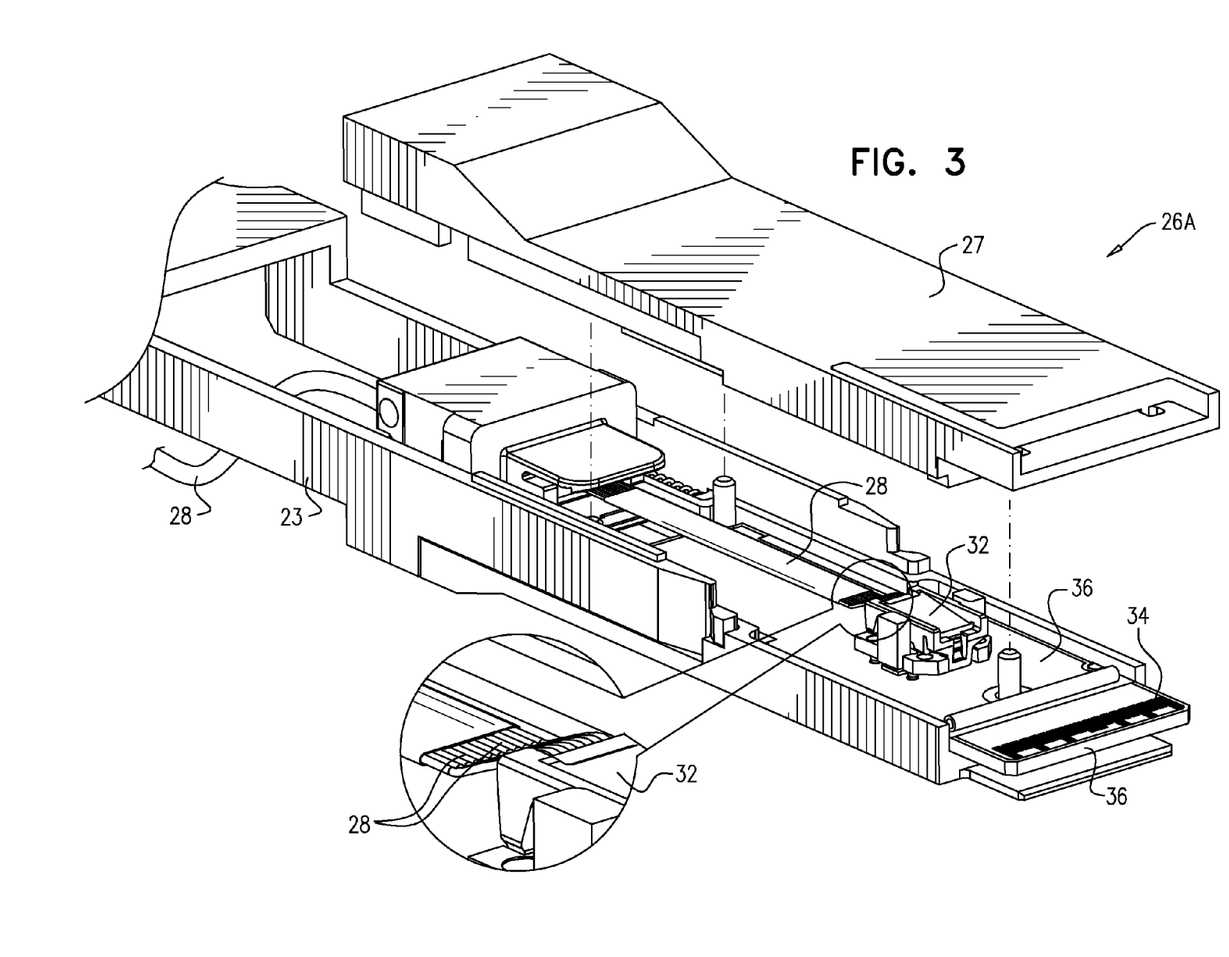

FIG. 2 is a schematic pictorial illustration of transceiver module 26A, and FIG. 3 is a schematic pictorial exploded illustration of the module, in accordance with an embodiment of the present invention.

A housing 23 comprises a handle 25 and a printed circuit board (PCB) 36 connected to one or more fibers 28. Handle 25 inserts/ejects PCB 36 to/from a socket in port 24A. PCB 36 conducts electrical communication signals, via copper inputs 34, into module 26A, which converts the electrical signals to optical communication signals. Fibers 28 carry the optical communication signals between module 26A and module 26B.

Module 26A comprises housing 23 and top cover 27, and comprises components of module 26A. Copper inputs 34 conduct an electrical communication signal via PCB 36 into an optical interface module 32, which converts the electrical communication signal into an optical communication signal. Module 32 comprises multiple transmitters, such as vertical-cavity surface emitting lasers (VCSELs). The VCSELs receive electrical inputs from PCB 36 and convert them to optical signals. Fibers 28 carry the optical communication signals from module 32, all the way to module 26B.

In some embodiments, active optical cable 30 is designed for duplex operation (e.g., transmits and receives optical communication signals on the same fiber). On the other hand, the principles of this embodiment are equally applicable to cables used for simplex communications (e.g., unidirectional communication per fiber), with only transmitters at one end, and receivers at the other end of fibers 28.

Figure 4:
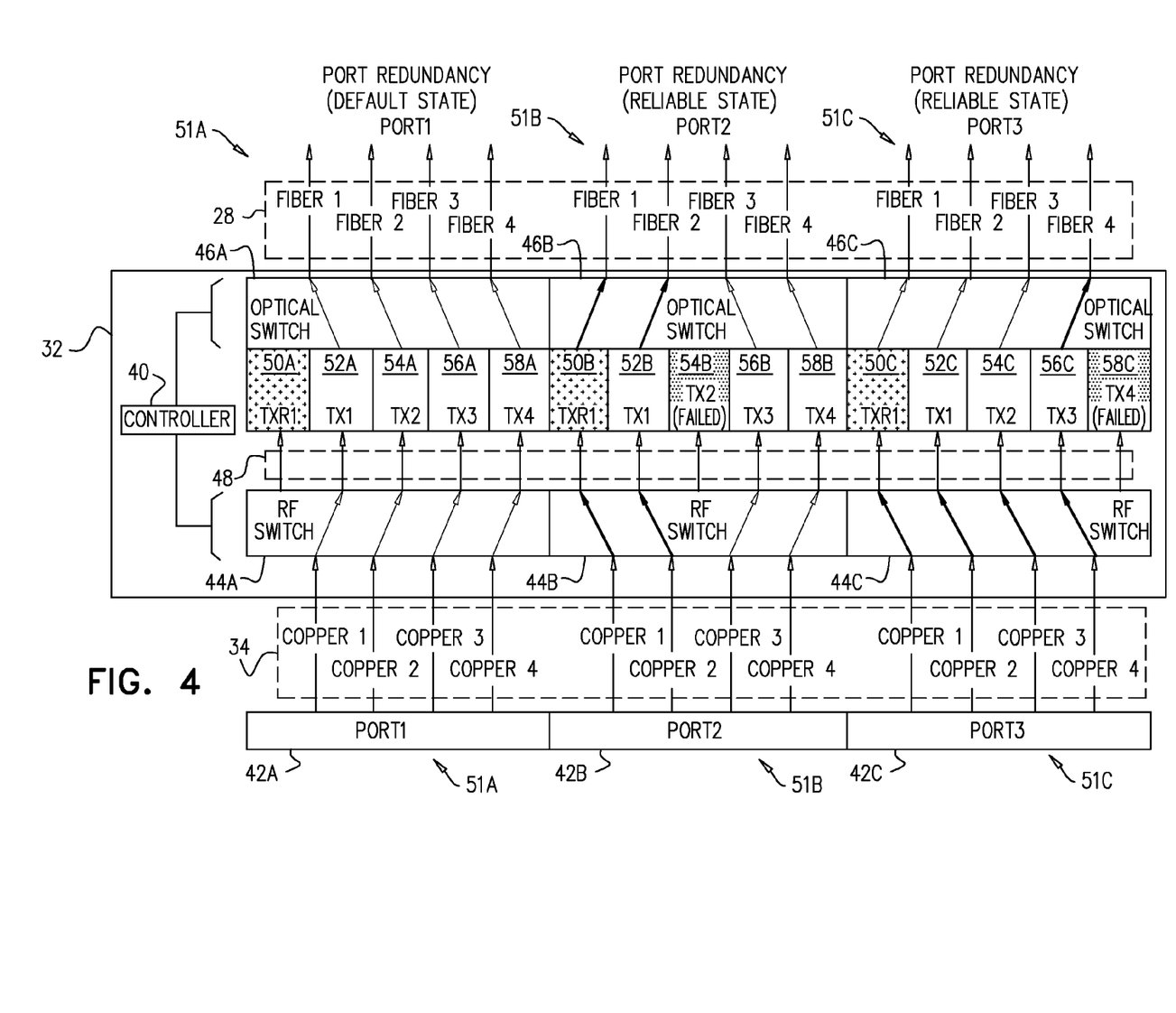
FIG. 4 is a block diagram that schematically illustrates an optical interface module in a transceiver module, in accordance with embodiments of the present invention.

FIG. 4 is a block diagram that schematically illustrates optical interface module 32 connected to copper inputs 34 and optical fibers 28, in accordance with an embodiment of the present invention.

In the example of FIG. 4, module 32 converts an electrical signal to an optical signal, which is then carried by optical fibers 28. FIG. 4 shows three channels 51A, 51B, and 51C, also generically referred to herein as channels 51. Each channel 51 comprises a port 42, copper inputs 34 (labeled "copper"), an RF switch 44, wires 48, an array of electro-optical transducers 50, 52, 54, 56, 58 also herein termed transmitters 50, 52, 54, 56, 58, an optical switch 46, and fibers 28. Like elements are differentiated as necessary by appending a letter to the identifying numeral, so that, for example, module 32 is connected to ports 42A, 42B, and 42C.

Thus, ports 42A, 42B, and 42C are also referred to herein as PORT1, PORT2, and PORT3.

The switches are controlled by a controller 40.

In module 32 electrical communication signals are conducted from ports 42, via copper inputs 34, to RF switches 44. The switches direct the signals, via wires 48, to selected active transmitters 50, 52, 54, 56, 58 in the transmitters array. Transmitters 50 are redundant transmitters which are typically idle, and transmitters 52, 54, 56, and 58 are operational transmitters which are typically active.

Each transmitter typically comprises a Vertical-cavity surface-emitting laser (VCSEL), or any other suitable transmitter, which converts the electrical signal to an optical signal. The optical signal is directed by one of optical switches 46 to four selected optical fibers 28 comprised in the active optical cable.

Considering channel 51A, transmitters 52A, 54A, 56A, and 58A operate properly, and thus, redundant transmitter 50A remains idle. As a result, all four signals are routed in default paths. For example, the electrical signal in input1 is directed by RF switch 44A to TX1 transmitter 52A, which converts the signal from electrical to optical, and the signal is subsequently directed by optical switch 46A, to fiber 1 28.

In second channel 51B, as for channel 51A, all four signals are originally routed in default paths, similar to those of channel 51A. In the second channel Transmitter 54B (TX2) fails, and thus, the signal from input2 has to be redirected by switch 44B. Accordingly, switch 44B changes the direction of the signals in input1 and input2, from respective transmitters 52B and 54B, to redundant transmitter 50B (which becomes operational) and to transmitter 52B, respectively.

Subsequently, optical switch 46B, directs the optical signals from transmitters 50B and 52B, to fibers 1 and 2 34 respectively, and thus, the failed TX2 54B is bypassed. Routing of the signals from input3 and input4 is unchanged relative to the default state; the signal from inputs 3 and 4 are directed to transmitters 56B and 58B, respectively, and then to fibers 1 and 2, respectively.

In third channel 51C, all four signals are originally routed in the same default paths as for channels 51A and 51B. In the third channel, transmitter 58C (TX4), which is located in the right-end of the array, fails. As a result, the signal from input4 has to be redirected by switch 44C.

Accordingly, switch 44C redirects all four signals in input1-input4 from their default respective transmitters 52C, 54C, 56C, and 58C, to redundant transmitter 50C and to transmitters 52C, 54C, and 56C, respectively. After bypassing transmitter 58C, the signals from input1-input4 are routed by optical switch 46C, to respective fibers 1-4.

In the configuration of module 32, at each channel, the redundant transmitter is located at the left-end of the five-transmitter array. In the event of a failed transmitter, the electrical signal which is originally routed to that failed transmitter, is redirected by the RF switch to an adjacent transmitter on the left side of the failed transmitter. All signals directed through transmitters located to the left of the failed transmitter, also shift one transmitter over to the left. This shift continues until the redundant transmitter receives an electrical signal, which operationalizes it, thus bypassing the failed transmitter. All directed signals to the right of the failed transmitter remain in their original route.

In some embodiments, the redundant transmitter may be located at the center (e.g., position three out of five) of a five-transmitter array. In this configuration two operational transmitters are located on each side of the redundant transmitter. In this embodiment, in an event of a failed transmitter, the average number of redirected signals is lower compared to the configuration where the redundant transmitter is located at the left end of the array.

In other embodiments, a different configuration may comprise a redundancy scheme using an array of twelve active transmitters and one standby transmitter. If all twelve active transmitters are functional, the array is operating in its default configuration, using the active transmitters, while the standby transmitter is idle. In the event of a failed transmitter, the redundant transmitter takes over its function and the signals are redirected accordingly.

The number of signals that are redirected in a given array depends on multiple parameters, such as number of active transmitters, number of redundant transmitters, location of the redundant transmitter, and location of the failed transmitter.

For example, in a redundancy scheme of twelve active transmitters and one redundancy transmitter, the redundant transmitter is located in position 6 (i.e., the sixth transmitter from the left side of the array), and a failed transmitter is located in position 8 (i.e., the eighth transmitter from the left side of the array). In this embodiment, signals that are targeted, by default, to transmitters in positions 7-8, are switched one position to the left (e.g., from transmitter 8 to transmitter 7, and from transmitter 7 to transmitter 6), while all the other signals in the array (e.g., signals in positions 1-5, and in positions 9-13) remain in their default transmitters.

In some embodiments, controller 40 receives an indication that a given optical transmitter failed and generates a set of orders to the respective RF switch and optical switch (e.g., switches 44A and 46A) to redirect the respective electrical and optical signals to the corresponding optical transmitter and fiber.

Controller 40 typically comprises a general purpose processor, which is programmed in software to carry out the functions described herein. The software may be downloaded to the processor in electronic form, over a network, for example, or, it may alternatively or additionally, be provided and/or stored on non-transitory tangible media, such as magnetic, optical, or electronic memory.

Various different technologies may be used in implementing both the electrical switching function between the ports and the transmitters and the optical switching function between the transmitters and the fibers. For example, the electrical switches may comprise broadband microwave transfer switches, such as Z0 differential impedance switches, as are known in the art. Alternatively, the electrical switches may comprise crossbar switches under digital control. Further alternatively, the electrical switches may comprise switched waveguides, which may be produced and switched using microelectromechanical systems (MEMS) technology.

On the optical side, the switches may similarly comprise MEMS devices, such as switched mirrors for deflecting the optical beams between the transmitters and the fibers. Alternatively, the optical switches may comprise liquid crystal device (LCD) switch arrays. Such arrays are described, for example, by Hirabayashi et al., in "Optical-Fiber Variable-Attenuator Arrays Using Polymer-Network Liquid Crystal," IEEE Photonics Technology Letters 13 (2001), pages 487-489, which is incorporated herein by reference. Further alternatively, any other suitable sorts of electrical and optical switching technologies may be used for transmitter switchover.

Detection of a Failed Transmitter

A failure of a given transmitter may be detected in several techniques.

In some embodiments, an item (e.g., switch B 22B) at the receiving end of active optical cable 30, detects a dark fiber, which means that a communication channel is not functioning. In such event, switch B commands controller 40, via a suitable in-band signal or out-of-band connection, to actuate the necessary switches to bypass the failed transmitter.

In other embodiments, a controller at the receiver end (e.g., switch B 22B) in active optical cable 30 may notify controller 40, or a controller at the transmit end (e.g., switch B 22B), of the need to bypass the failed transmitter.

In further other embodiments, a controller at the transmit end (e.g., switch A 22A) may locally sense changes in the response of a failed transmitter (for example, to respective driver circuit) and thus detects the failure based on changes in the characteristics of the failed transmitter. Changes in the response may comprise, for example, changes in current consumption, impedance, or any other suitable measure.

The configurations of cable 30 shown in FIGS. 1-4 are example configurations, which are chosen purely for the sake of conceptual clarity. In alternative embodiments, any other suitable configuration can be used for implementing the active optical cable. Certain elements of cable 30 can be implemented using hardware, such as using one or more Application-Specific Integrated Circuits (ASICs) or Field-Programmable Gate Arrays (FPGAs) or other device types. Additionally or alternatively, certain elements of cable can be implemented using software, or using a combination of hardware and software elements.

Figure 5:
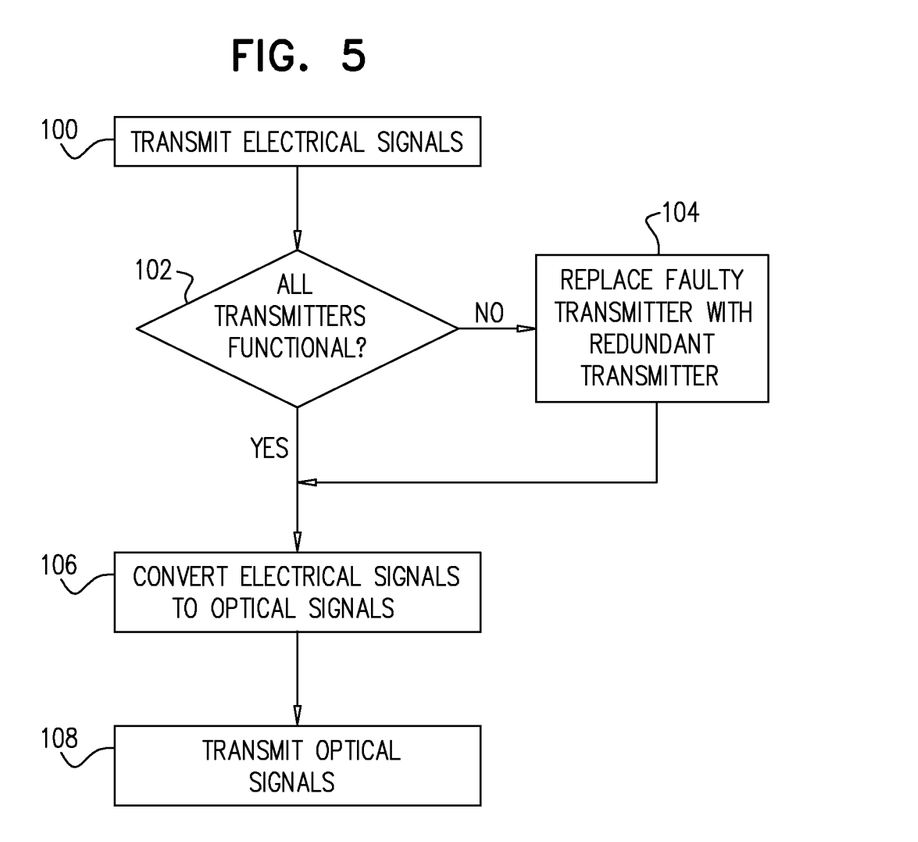
FIG. 5 is a flow chart that schematically illustrates a method for improving active optical cable reliability, in accordance with an embodiment of the present invention.

FIG. 5 is a flow chart that schematically illustrates a method for improving active optical cable 30 reliability using redundant emitters, in accordance with an embodiment of the present invention.

The method begins with an electrical transmission step 100, port1 42A transmits electrical communication signals via copper inputs 34, to RF switch 44A. At a decision step 102, controller 40 monitors the electrical signals and checks if all default transmitters (i.e., TX1-TX4) are functional. If all transmitters are functional, the four electrical signals are directed by the RF switch (e.g., switch 44A), via wires 48, to transmitters TX1-TX4, which convert the electrical signals to optical signals, at a signal conversion step 106. If a given transmitter (in the group of TX1-TX4) fails, controller 40 orders RF switch 44A to redirect the electrical signals and thus, to replace the failed transmitter with a redundant transmitter (e.g., transmitter 50A), at a replacement step 104. After replacement step 104, the method loops forward to signal conversion step 106, as described above. At an optical transmission step 108, optical switch 46A directs the four optical signals obtained at conversion step 106, to four corresponding fibers 28.

Although the embodiments described herein mainly address redundant optical emitters, the methods and systems described herein can also be used for replacing failed optical detectors with redundant detectors.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an array of at least three electro-optical transducers, which are configured to convert between electrical signals and respective optical signals conveyed over respective optical fibers; and
   control circuitry, which is configured, in response to a failure of a first electro-optical transducer in the array that is associated with a first optical fiber, to switch one or more of the electrical signals and the optical signals so as to replace the first electro-optical transducer with a second, operative, electro-optical transducer in the array in conveying a first optical signal over the first optical fiber, and to replace the second electro-optical transducer with a third, operative, electro-optical transducer in the array in conveying a second optical signal over a second optical fiber; and a connector housing, which contains the array of the at least three electro-optical transducers and the control circuitry.

2. The apparatus according to claim 1, wherein the control circuitry comprises two or more optical switches which are configured to switch one or more of the optical signals.

3. The apparatus according to claim 1, wherein the control circuitry comprises two or more electrical switches which are configured to switch one or more of the electrical signals.

4. The apparatus according to claim 1, wherein the control circuitry comprises a controller, which is configured, in response to the failure of the first electro-optical transducer, to switch one or more of the electrical signals and the optical signals.

5. The apparatus according to claim 4, wherein the controller receives an input of the failure from an external source.

6. The apparatus according to claim 5, wherein the input of the failure from the external source comprises a detector at a receiving end of the first optical fiber, which is configured to detect that the optical signal is not conveyed over the first optical fiber, and to send the input to the controller.

7. The apparatus according to claim 5, wherein the input of the failure from the external source comprises an equipment at a transmitting end of the electrical signal.

8. The apparatus according to claim 5, wherein the input of the failure from the external source comprises a detected change in a response of the failed first electro-optical transducer.

9. The apparatus according to claim 1, wherein the electro-optical transducers comprise optical emitters.

10. The apparatus according to claim 1, wherein the electro-optical transducers comprise optical detectors.

11. The apparatus according to claim 1, wherein the array comprises at least three regular transducers and a redundant transducer serving as the second electro-optical transducer,
wherein each transducer in the array has at most two neighboring transducers, and
wherein, in response to the failure, the control circuitry is configured to switch the electrical signals and the optical signals of the electro-optical transducers located between the first electro-optical transducer and the redundant transducer, such that the optical signal serviced by each switched transducer is switched to a respective neighboring transducer towards the redundant transducer.

12. The apparatus according to claim 1, wherein the array comprises a given number of electro-optical transducers, which is larger than the number of the respective optical fibers.

13. A method, comprising:
converting between electrical signals and respective optical signals conveyed over respective optical fibers, using an array of at least three electro-optical transducers; and
in response to a failure of a first electro-optical transducer in the array that is associated with a first optical fiber, switching one or more of the electrical signals and the optical signals, so as to replace the first electro-optical transducer with a second, operative, electro-optical transducer in the array in conveying a first optical signal over the first optical fiber and replacing the second electro-optical transducer with a third, operative, electro-optical transducer in the array in conveying a second optical signal over a second optical fiber.

14. A method, comprising:
providing an array of at least three electro-optical transducers, which are configured to convert between electrical signals and respective optical signals conveyed over respective optical fibers;
connecting the array of electro-optical transducers to control circuitry, which is configured, in response to a failure of a first electro-optical transducer in the array that is associated with a first optical fiber, to switch one or more of the electrical signals and the optical signals so as to replace the first electro-optical transducer with a second, operative, electro-optical transducer in the array in conveying a first optical signal over the first optical fiber, and to replace the second electro-optical transducer with a third, operative, electro-optical transducer in the array in conveying a second optical signal over a second optical fiber; and
packaging the array of the at least three electro-optical transducers and the control circuitry in a connector housing.

* * * * *